3,649,648
PREPARATION OF HIGH MOLECULAR
WEIGHT EPOXIDES
David S. Fetterman, Maple Glen, Pa., assignor to Atlantic Richfield Company, New York, N.Y.
No Drawing. Filed Feb. 20, 1970, Ser. No. 13,194
Int. Cl. C07d 1/08, 1/12
U.S. Cl. 260—348.5 L    3 Claims

ABSTRACT OF THE DISCLOSURE

In a water-free process for preparing higher molecular weight epoxides by the reaction of an organic hydroperoxide and a higher molecular weight olefin, the separation of the epoxide product from the alcohol by-product is improved by the addition of water before distillation.

BACKGROUND OF THE INVENTION

Field of the invention

This invention relates to the epoxidation of olefinically unsaturated organic compounds to the corresponding oxirane compounds wherein organic hydroperoxides are used as the epoxidizing agents and the reaction is carried out in a non-aqueous media. The higher molecular weight epoxide must be separated from the other reaction after the reaction.

Description of the prior art

In the prior art the reaction product was heated and the epoxide was distilled from the other reaction products, however, contrary to what happens when lower molecular weight epoxides are distilled, for instance, propylene oxide, higher molecular weight epoxides decompose partially upon distillation so that the yields of epoxide are low. The prior art related to the preparation of lower molecular weight epoxides is not related to this invention because that process does not involve the aforementioned problems of decomposition since lower epoxides such as propylene oxide may be recovered in substantially one hundred percent yields by simple distillation. The prior art related to aqueous systems for preparing epoxides is also unrelated to the present invention. The advantages of non-aqueous epoxide preparation over aqueous is well known in the art. See Kollar, U.S. 3,351,635, Nov. 7, 1967 which shows the great advantages of a non-aqueous system.

SUMMARY OF THE INVENTION

It is therefore an object to effectively separate high molecular weight epoxides from the reaction by-products without decomposing the higher molecular weight epoxide.

DESCRIPTION OF THE PREFERRED EMBODIMENTS

The non-aqueous preparation of higher molecular weight epoxides can be carried out by reacting an organic hydroperoxide and a higher molecular weight olefin in the presence of a catalytic amount of molybdenum, tungsten, titanium, columbium, tantalum, rhenium, selenium, chromium, zirconium, tellurium or uranium. The organic hydroperoxide is converted in this process to the corresponding organic alcohol and the olefin is converted to the corresponding epoxide.

The olefins suitable for this process have from about 9 to 20 carbon atoms and preferably 12 to 16 carbon atoms, although olefins having greater than 20 carbon atoms would also be operable species. Illustrative olefins are dodecene, tridecene, tetradecene, pentadecene, hexadecene, and mixtures thereof. Either alpha or internally unsaturated mixtures of alpha and internally unsaturated compounds can be used. Olefins having halogen, oxygen, sulfur and the like containing substituents can be used. Also, olefinically unsaturated polymers having up to 20 carbon atoms in the repeating unit may also be used.

Catalysts suitable are the finely divided metals mentioned above or compounds in a soluble form of these metals. The amounts and form of this catalyst may be found in the Kollar patent mentioned supra. The organic hydroperoxide suitable for the reaction may be any having the formula ROOH wherein R is an organic radical. Preferably, R is a substituted or unsubstituted alkyl, cycloalkyl, aralkyl, aralkenyl, hydroxyarylalkyl, cycloalkenyl, hydroxycycloalkyl and the like having about 3 to 20 carbon atoms. R may be a heterocyclic radical. Illustrative are cumene hydroperoxide, ethylbenzene hydroperoxide, cyclohexanone peroxide, triphenyl carbinol, z-eicosanol, TBHP and others mentioned in Kollar patent supra. The reaction is carried out under varying conditions. The temperature can be varied depending on the particular olefin and organic hydroperoxide being reacted and can be broadly between $-20$ and $200°$ C., however, it is highly preferable that the reaction temperature be kept above the melting point of the olefin being reacted. The reaction is carried out at pressure conditions sufficient to maintain a liquid phase, preferably from atmospheric to 1000 p.s.i.g. The ratio of olefin to organic hydroperoxide may be varied. Preferably, the range of weight ratios of olefin to hydroperoxide is from 0.5:1 to 100:1. The epoxidation reaction can be carried out in the presence of a non-aqueous solvent, preferably having the same carbon skeleton as the hydroperoxide used. For instance, when tertiary butyl hydroperoxide is used, tertiary butyl alcohol is the preferred solvent. Reaction times range from a minute to many hours, preferably about 10 minutes to 10 hours. A more detailed description of the reaction conditions may be found in Kollar patent supra. As the prior art notes, a great advantage of this non-aqueous epoxidation reaction is the almost quantitative conversion of the organic hydroperoxide to the corresponding alcohol which can itself be recovered or converted back to the hydroperoxide for re-use in the reaction. The epoxide product is recovered by distillation according to this invention. The distillation may be carried out in a series of distillation steps or in a multi-product column to isolate the various products, under reduced pressures. The pressure range is from 10 to 750 mm. Hg absolute and preferably 100 mm. to 300 mm. Hg absolute. If the products are distilled by prior art methods under vacuum, considerable decomposition occurs during this distillation and recovery of product is low. According to this invention, water is added to the product mixture before distillation in the weight range of 0.2:1 to 1.25:1 based on the weight of the alcohol in the product mixture. This has the effect of causing the alcohol to azeotropically distill with the water, with the excess water remaining as a heterogeneous layer in the pot, and allows distillation at much lower temperatures. For example, when a mixture of tertiary butyl alcohol and a $C_{16}$ olefin oxide is distilled without the water addition, the temperature required is between 400 to $460°$ F. with a consequent loss of 25 percent of the epoxide through decomposition. However, when water is added, the distillation can be carried out at about $112°$ to $160°$ F. and the 25 percent loss of epoxide associated with the higher temperature is eliminated completely. This invention has an additional advantage in certain of the embodiments in that the alcohol is prevented from freezing in the overhead column condensation system. For instance, tertiary butyl alcohol freezes at $81°$ F., but the freezing point of a 20 percent water, 80 percent tertiary butyl alcohol composition is below 32° F. so that it does not freeze in the distillation apparatus. The excess water remaining in the pot is easily separated from the epoxide product since it is a two-phase system, that is, the water and epoxide are immiscible.

The following examples are merely illustrative of the invention and are not limiting.

EXAMPLE I

The mixture of olefins having from 14 to 18 carbon atoms was epoxidized with tertiary butyl hydroperoxide following the addition of molybdenum naphthanate to provide the catalyst by heating to 132° C. for one hour at a pressure in the range of from 50 to 200 p.s.i.g. The epoxidation product was treated with sodium sulfite to remove the catalyst and excess tertiary butyl hydroperoxide. To 3853 grams of the product comprising 25.8 percent epoxides by weight, 1156 grams of water were added and the mixture heated to distill off the tertiary butyl alcohol in a 12 liter Oldershaw distillation column at an absolute pressure of 155 mm. of Hg. There remained 941 grams of water and 2522 grams of epoxide in separate phases in the pot of the distillation apparatus. The water was separated and 100 percent of the epoxide was recovered.

EXAMPLE II (Comparative)

An identical epoxidation reaction was carried out and the product treated with sodium sulfite as in Example I. 3853 grams of the product was distilled in an identical apparatus at the same pressure as Example I without adding water. It was necessary to heat the reboiler to 400° F. in order to distill off the tertiary butyl alcohol. After 4½ hours the distillation was stopped and the epoxide remaining was weighed and showed a loss of 19 percent due to decomposition at the excess distillation temperatures.

Another run was made and the temperature reached 460° F. for 5 hours. The percent loss of epoxide was 25 percent.

A third run was made and a temperature of 380° F. was necessary during a three hour distillation to distill off the tertiary butyl alcohol. A 24 percent loss of epoxide resulted.

It will be understood that the invention is not limited to the specific embodiment or application described hereinbefore and that departures from the specific embodiment and illustrations may be made without departing from the spirit and scope of the invention.

I claim:

1. A method for preparing an epoxide comprising reacting an olefinically unsaturated compound having at least about 9 carbon atoms and an organic hydroperoxide in the presence of a catalyst and in the absence of water, and thereafter distilling to separate the alcohol by-product from the epoxide product, the improvement comprising adding water in the amount of from 20 percent to 125 percent as compared with the weight of alcohol prior to distillation.

2. The process of claim 1 wherein the olefin is selected from the group consisting of $C_9$ to $C_{20}$ olefins.

3. The process of claim 1 wherein the product of the epoxidation reaction is pretreated with sodium sulfite prior to distillation.

No references cited.

NORMA S. MILESTONE, Primary Examiner

U.S. Cl. X.R.

260—348 R; 203—95, 33